United States Patent
Bartholomew

(10) Patent No.: US 7,748,667 B1
(45) Date of Patent: Jul. 6, 2010

(54) FOLDING PORTABLE LAPTOP STAND

(76) Inventor: Gary A. Bartholomew, 433 E. Golf Rd., Des Plaines, IL (US) 60016

(*) Notice: Subject to any disclaimer, the term of this patent is extended or adjusted under 35 U.S.C. 154(b) by 0 days.

(21) Appl. No.: 12/350,759

(22) Filed: Jan. 8, 2009

Related U.S. Application Data

(60) Provisional application No. 61/020,255, filed on Jan. 10, 2008.

(51) Int. Cl.
*A47G 23/02* (2006.01)
(52) U.S. Cl. ........................ 248/150; 248/917
(58) Field of Classification Search ................ 248/150, 248/346.01, 346.03, 176.1, 907; 361/679.02, 361/679.26
See application file for complete search history.

(56) References Cited

U.S. PATENT DOCUMENTS

| | | | | |
|---|---|---|---|---|
| 6,044,758 A | * | 4/2000 | Drake | 100/43 |
| 6,305,117 B1 | * | 10/2001 | Hales, Sr. | 42/94 |
| 6,494,419 B2 | * | 12/2002 | Pai | 248/127 |
| 6,634,420 B2 | * | 10/2003 | Gokan et al. | 165/157 |
| 7,398,950 B2 | * | 7/2008 | Hung | 248/276.1 |
| 7,487,940 B2 | * | 2/2009 | Saez et al. | 248/176.1 |
| 7,570,482 B2 | * | 8/2009 | Chan | 361/679.21 |
| 2005/0121566 A1 | * | 6/2005 | Hennessey et al. | 248/150 |

* cited by examiner

*Primary Examiner*—Ramon O Ramirez
(74) *Attorney, Agent, or Firm*—Patnaude and Videbeck

(57) ABSTRACT

A folding portable laptop computer stand mounts to the bottom of a laptop computer. In folded position, its sides and base parallel the bottom of the computer. The base is flat and sits on the lap of a user, or a desktop. When the sides are unfolded they extend from the base, lift the computer above a user's lap, tilt the keyboard for ease of use and provide space under the computer for a full size mouse pad or stylus drawing pad.

18 Claims, 14 Drawing Sheets

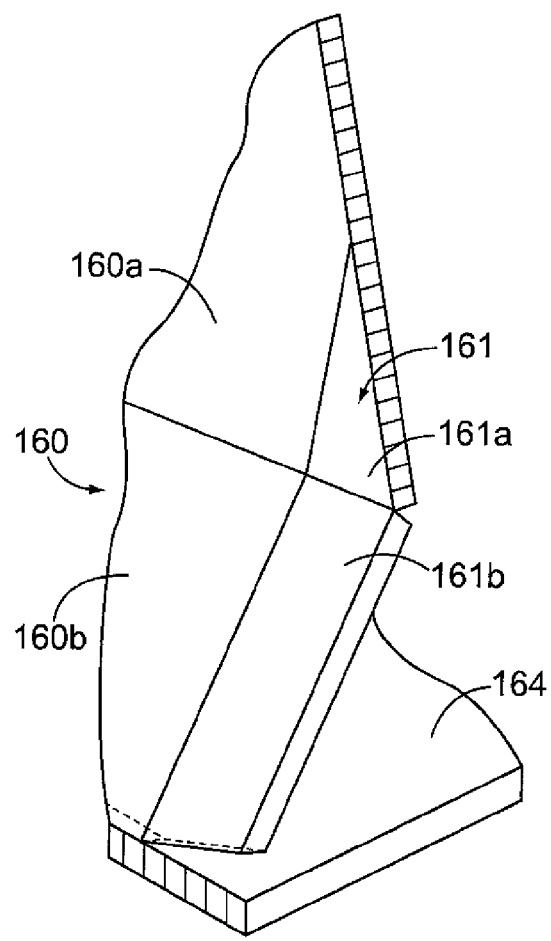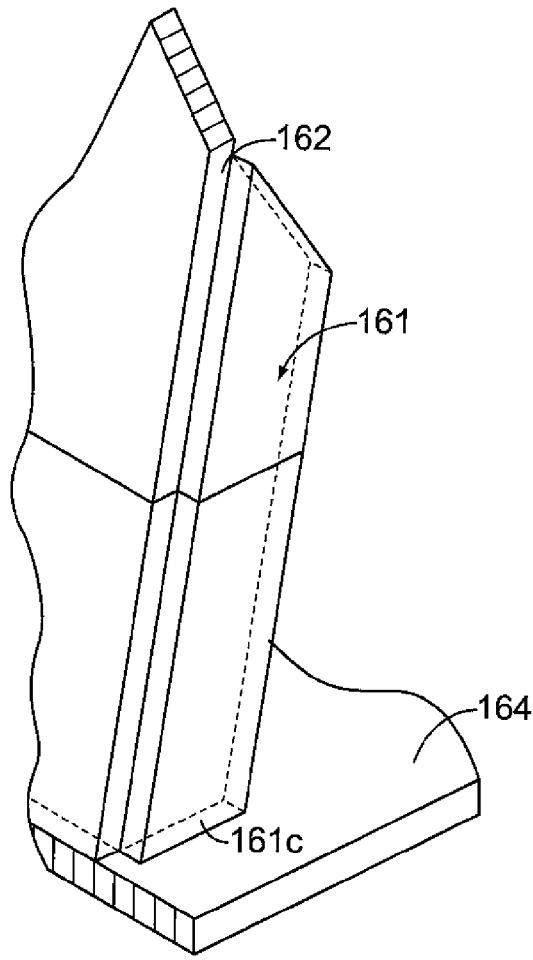
FIG. 22     FIG. 23
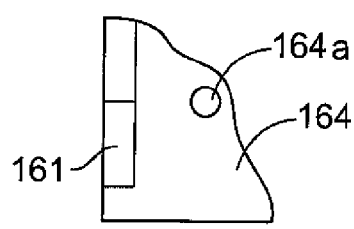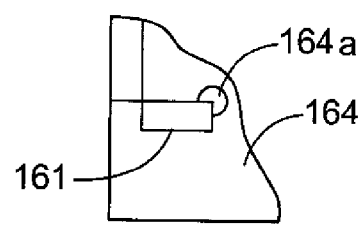
FIG. 24     FIG. 25

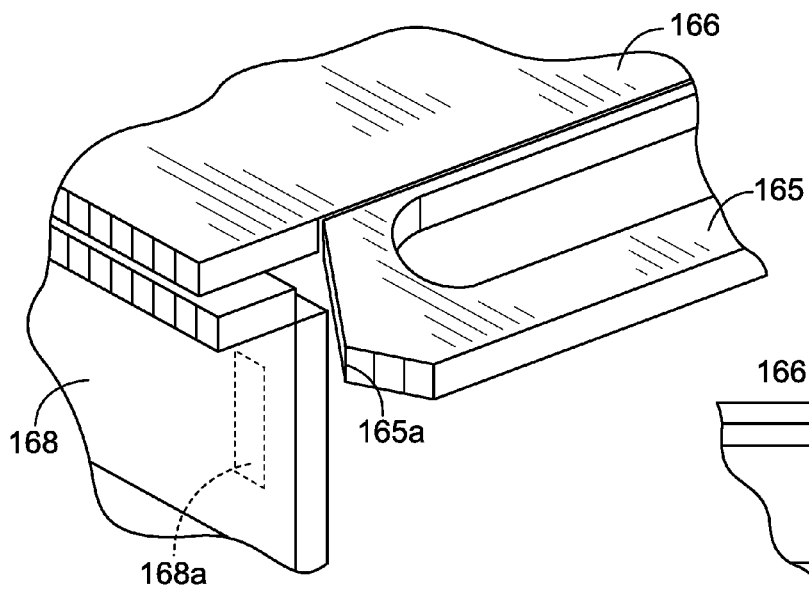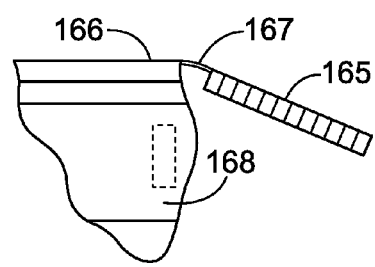
FIG. 26
FIG. 27
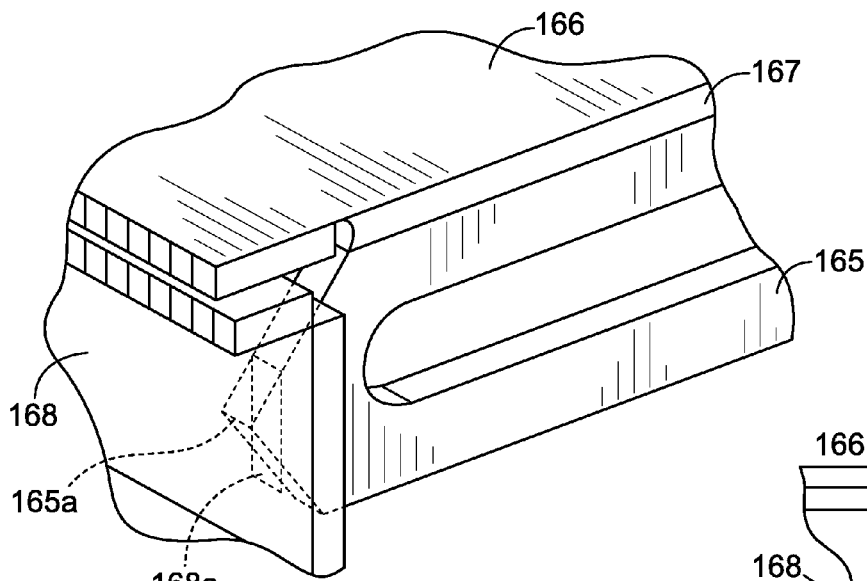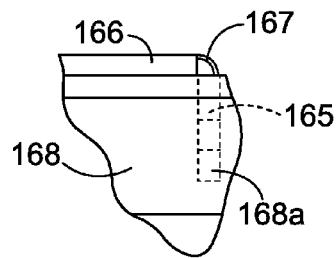
FIG. 28
FIG. 29

FOLDING PORTABLE LAPTOP STAND

The invention relates generally to a positioning accessory for a laptop computer and, more particularly, to a collapsible, raised platform for positioning a laptop computer spatially above a user's lap and angling the keyboard of the computer toward the user. The laptop stand also positions the computer substantially above a user's lap to allow the positioning of a mouse, mouse pad, stylus pad, or the like, underneath the computer and yet on top of a user's lap. Applicant claims priority of Provisional Application Ser. No. 61/020,255 filed Jan. 10, 2008, the contents of which are incorporated herein by reference.

BACKGROUND OF THE INVENTION

The idea of the laptop computer, originally called "portable computer," was meant to be positioned on a desktop, but be portable for the benefit of a user. As computers diminished in size, mainly thickness, the term "laptop" became more prominent. The laptop computer became thinner and, if actually positioned on one's lap, one found both the keyboard and viewing screen in a lower than optimal position.

Further, the power supply unit of the laptop computer generates heat which finds its way under the keyboard of the computer, heating the user's legs.

As a result of these limitations in the positioning of the laptop computer, docking stations and other accessories have been developed to more closely fulfill the potential of the laptop computer if able to be positioned somewhat differently from sitting flat on the lap of a user.

A need has developed for a portable accessory for use in connection with a laptop computer that more favorably positions the computer above the lap of a user.

Additionally, a need has developed for a laptop computer accessory that positions the computer above the lap of the user, and also allows the user to have space under the computer to allow use of a mouse on a mouse pad, a stylus on a stylus pad, or the like.

Further, a need has developed for a portable laptop computer accessory that allows the computer to be positioned above a user's lap and allows the keyboard to be positioned in an ergonomically more efficient position for a user's hands.

Another need has developed for a laptop computer positioning accessory that attaches to the bottom of a laptop computer and conveniently collapses to a thin, folded condition when not in use such that it may be positioned in a laptop computer carrying case along with the laptop computer.

Additionally, a need has developed for a foldable laptop computer accessory that releaseably attaches to the bottom of a laptop computer and not only folds and unfolds to a position to elevate and more ergonomically position the laptop computer when used adjacent the lap of a user, but also allows the combination laptop computer and accessory to be carried when the accessory is in a folded position by having a conveniently placed comfortable user's handle positioned thereon.

SUMMARY OF THE INVENTION

The invention resides in a folding portable laptop stand that comprises a generally flat base including at least two opposed side edges, first and second folding opposed sides extending from respective ones of the opposed side edges of the said base. Each of the first and second opposed sides includes means adjacent an edge thereof for mounting same to one of a platform and the base of a laptop computer. Selectably releasable means for locking each of the first and second foldable opposed sides in an open position are mounted adjacent the sides.

BRIEF DESCRIPTION OF THE DRAWINGS

The features of the present invention which are believed to be novel are set forth with particularity in the appended claims. The invention may best be understood from the following detailed description of a currently preferred embodiment thereof taken in conjunction with the accompanying drawings, wherein like numerals refer to like parts, and in which:

FIG. 22 is a fragmentary detailed perspective view of a modification of the second embodiment of the present invention showing a folding rear member of the side of the second embodiment;

FIG. 23 is a fragmentary detailed perspective view of the folding member shown in FIG. 22 in locked folded position;

FIG. 24 is a fragmentary detailed top plan view of the folding member shown in FIG. 22;

FIG. 25 is a fragmentary detailed top plan view of the embodiment shown in FIG. 23;

FIG. 26 is a detailed fragmentary perspective view of a second modification of the second embodiment of the present invention showing a folding and locking handle;

FIG. 27 is a detailed fragmentary side elevational view of the handle shown in FIG. 26;

FIG. 28 is a detail fragmentary perspective view of the handle shown in FIG. 26 in folded and locked position;

FIG. 29 is a side elevational view of the handle shown in FIG. 28;

DETAILED DESCRIPTION OF THE PREFERRED EMBODIMENTS

Figure 1:
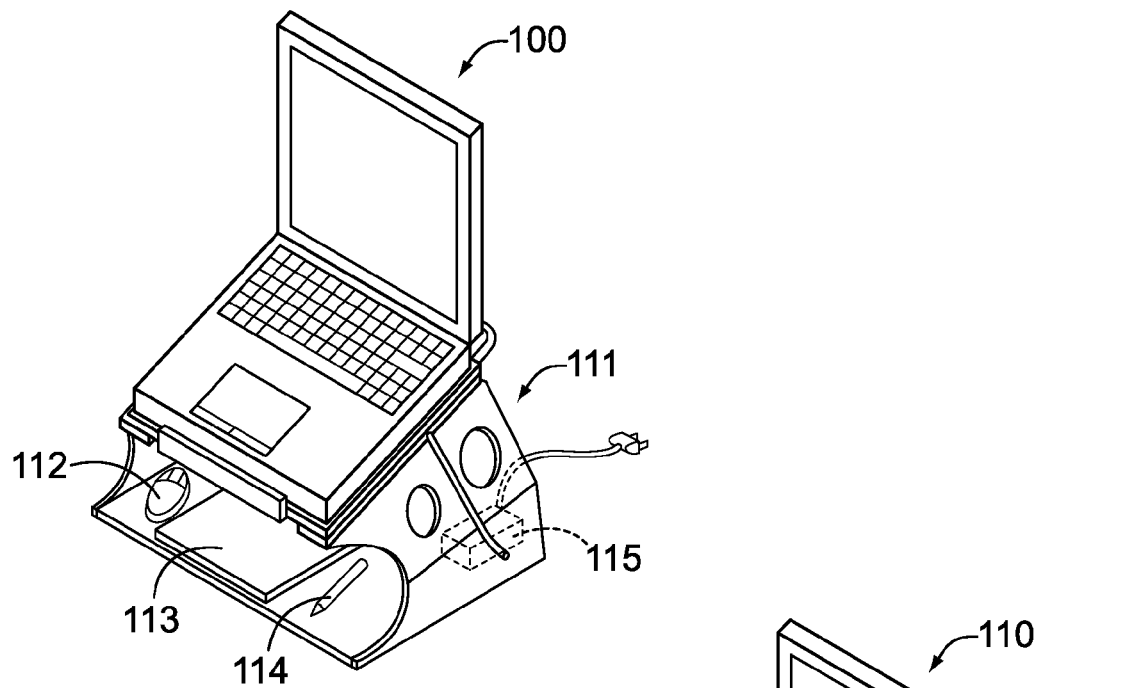
FIG. 1 is a ¾ front perspective view of a first embodiment of the laptop computer accessory, constructed in accordance with the present invention, mounted on the bottom of a laptop computer.

Referring to FIG. 1, a conventional laptop computer 110 is shown in open position mounted atop a first embodiment of an accessory 111 constructed in accordance with the present invention, shown in open and locked position.

The accessory 111 may be called a lectern or pulpit-type foldable spacer that can be positioned on a user's lap or on a desk top, etc. (not shown). The accessory in the open and unlocked position has sufficient space under the laptop computer 110 to slide a mouse 112 thereon for operation with the computer 110, or position a stylus pad 113 and stylus 114 for a person who draws in connection with using the laptop computer. Space may also be provided at the back of the hollow interior of the accessory for a transformer 115 or other implement that would be used in connection with plug in power to the computer.

Figure 2:
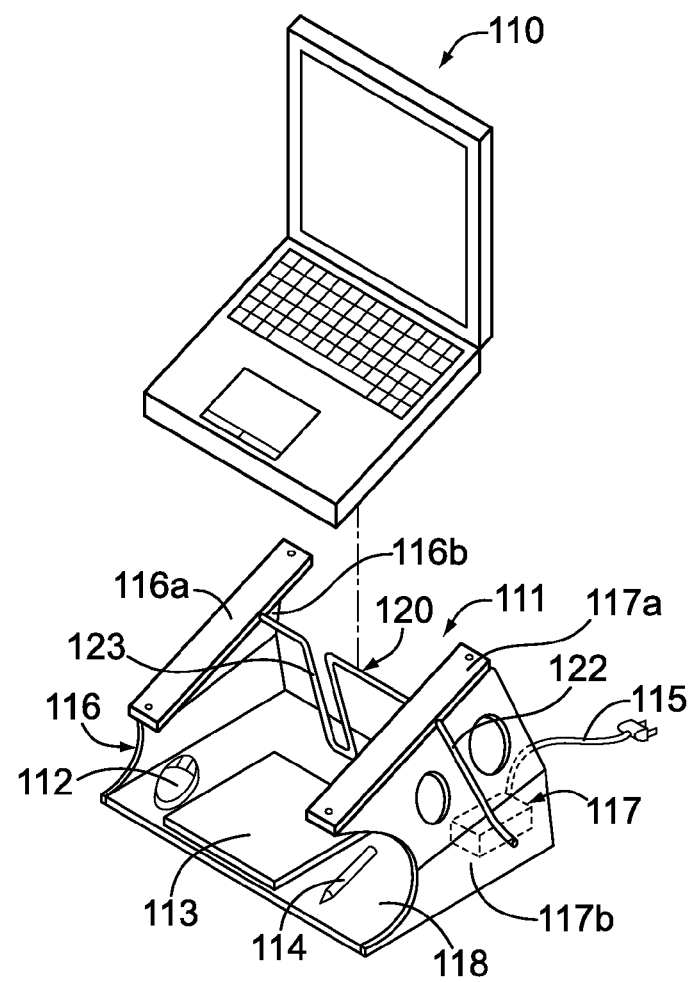
FIG. 2 is an exploded perspective view of the laptop computer and accessory of the present invention shown in FIG. 1.

Referring to FIG. 2, the opposed foldable sides 116, 117 of the computer accessory 111 provides at each of its outer edges a mounting flap 116a, 117a, respectively, making up the top sides of the first embodiment of the accessory. Those flaps 116a, 117a may be mounted to a computer bottom by hook and loop strips, commonly sold under the trademark VEL-CRO, or may be supplied with snap on buttons that mate with complementary recesses in the laptop computer, or other fastening means. The accessory shown in FIGS. 1 and 2 has a generally rectangular base 118, and a pair of generally trapezoidal two-piece folding sides 116, 117 which, in this embodiment, fold outwardly when the accessory is in its closed position.

A generally W-shaped wire structure 120 including a pair of opposed straight ends 121, 122, and a handle-like middle 123, is pivotally mounted on the end or mounting flaps 116a, 117a such that moving the handle in the hollow interior of the accessory moves the end arms 121, 122 downwardly across a living hinge 116b, 117b, respectively, in the middle of each of the two-piece trapezoidal sides 116, 117 to maintain those sides in an unfolded upright position. Pivoting the handle 123 toward the horizontal allows the two-piece trapezoidal sides 116, 117 to collapse when the accessory 111 is not in use.

Figure 3:
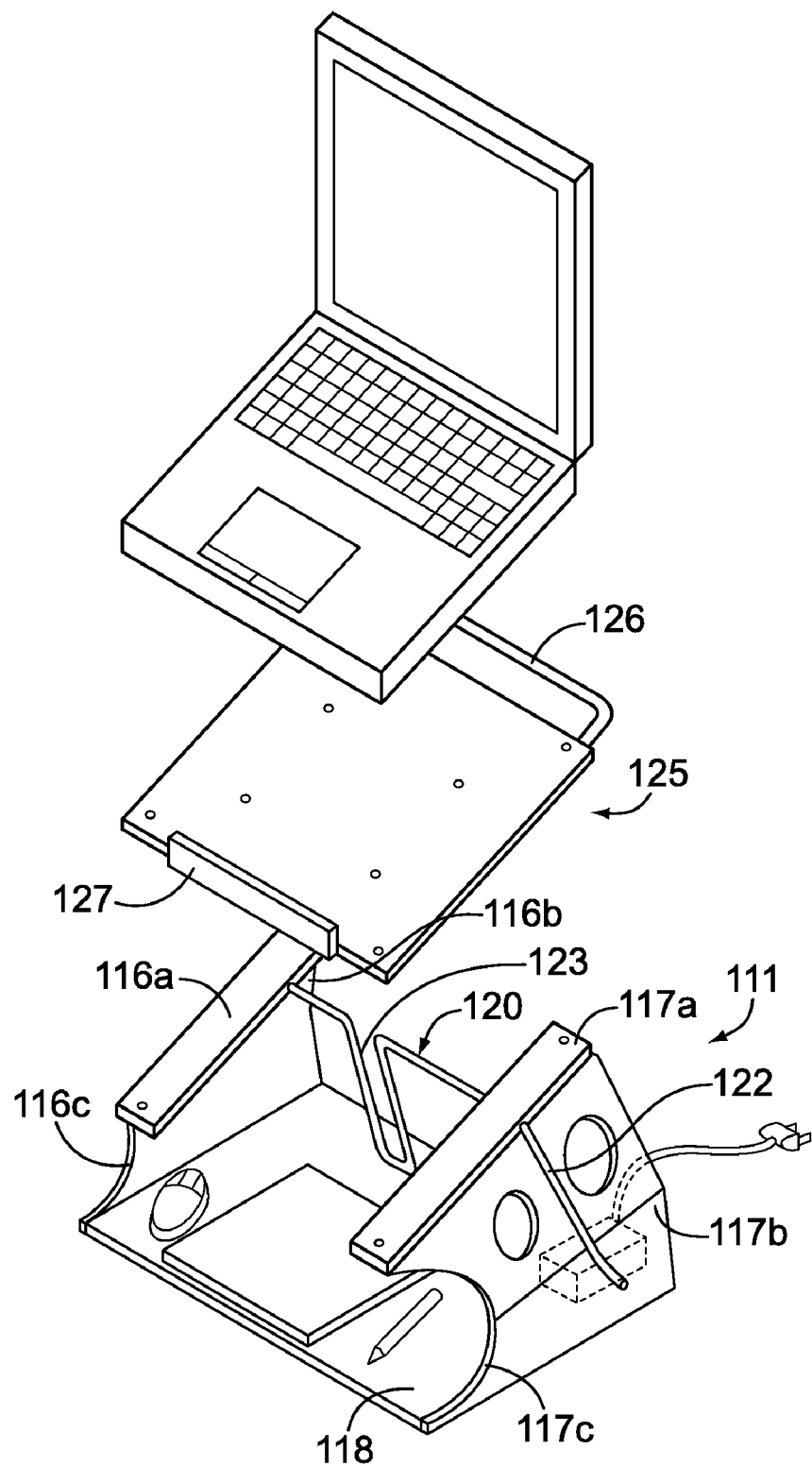
FIG. 3 is an exploded perspective view similar to that shown in FIG. 2 with the addition of an upper plate for the computer accessory of the present invention.

Referring to FIG. 3, a first modification of the first embodiment 111 of the present invention is shown to include a generally rectangular flat top portion or plate generally indicated at 125 that, in this modification, is permanently affixed to the upper flaps 116a, 117a adjacent the foldable side panel of the accessory of the present invention. The generally rectangular panel is sized and configured to retain the bottom of a laptop computer 110 thereon. The panel 125 of the modification also includes a handle 126 adjacent the rear end thereof for carrying the combination laptop computer and folding accessory, and also an L-shape ledge 127 extending upwardly from the front side of the panel 125 to form a resting place for the front of the bottom of the laptop computer 110 when positioned thereon.

As shown in FIG. 3, the generally smaller front ends of the trapezoidal side surfaces 116, 117 may include portions cut away 116c, 117c to allow free ergonomic access for a user's hand (not shown) or arm to operate the locking hinge 123 or other apparatus positioned on top of the base 118 of the accessory 111.

While the accessory 111 of the invention may be made of many differing sheet materials, manufacturing and other considerations make plastic a preferred material for the accessory. As shown herein, the panels of the accessory may be made of a corrugated plastic with a pair of opposed spaced apart inner and outer side walls and transverse perpendicular webs (FIGS. 16, 17 and 21) extending between the spaced walls forming pockets therein. This corrugated plastic material is extremely versatile and, as will be shown hereinafter, provides interior spaces for pivotal mounting of locking and positioning members. Also, each of the side walls when the opposing side wall is cut or separated, may provide a living hinge such as at 116b, 117b along the interior of the space between adjacent webs perpendicular to the outer surfaces. The operation of such living hinges will be described in more detail below.

As noted with the first embodiment, if the outer surface of the corrugated plastic is cut, along with cuts through successive ones of the parallel interior webbing, across the grain thereof, a living hinge is also formed on the remaining surface. Such a living hinge is shown at FIGS. 1 and 2 of the first embodiment of the present invention. Such a living hinge is also shown between the upper side edge of the two-piece side surfaces 116, 117 and the mounting flap 116a, 117a adjacent each.

Figure 4:
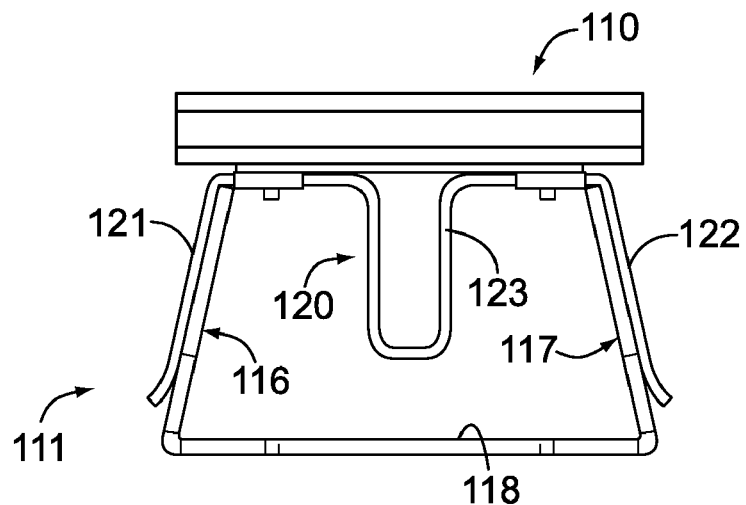
FIG. 4 is a rear elevational view of the first embodiment laptop accessory of the present invention with the side walls shown in extended and locked position.
Figure 5:
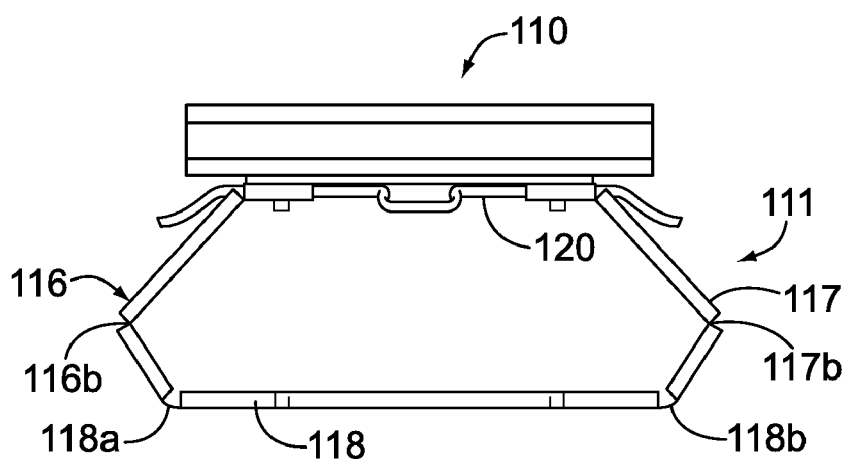
FIG. 5 is a rear elevational view of the computer and accessory of the present invention shown in semi-collapsed position.
Figure 6:
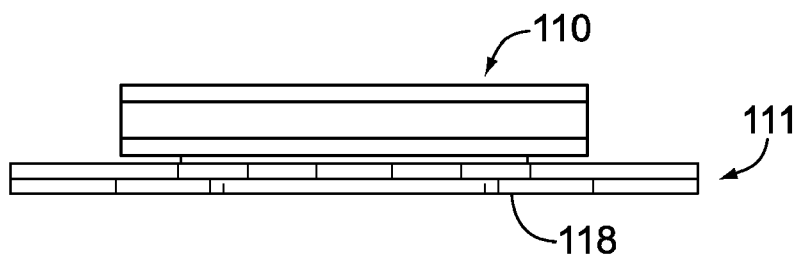
FIG. 6 is a rear elevational view of the laptop computer and accessory of the present invention shown in collapsed position.
Figure 7:
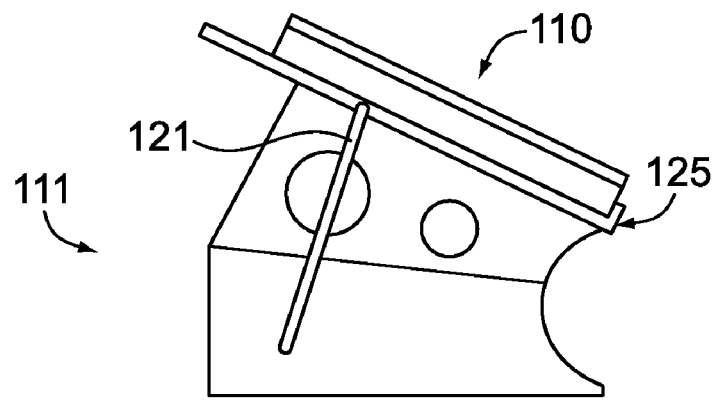
FIG. 7 is a side elevational view of the laptop accessory and computer shown in FIG. 4.
Figure 8:
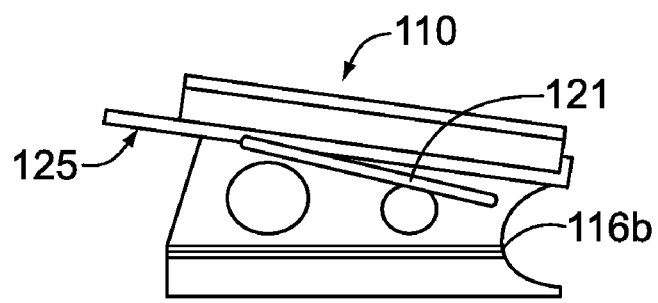
FIG. 8 is a side elevational view of the computer and accessory shown in FIG. 5.

FIGS. 4 through 9 disclose how the accessory 111 of the first embodiment folds from its open position to its flat closed position. In FIGS. 4 and 7, the accessory is shown in its open locked position with its generally trapezoidal two-piece sides 116, 117 locked in their parallel position by the generally W-shaped pivoting arm 120 which is in its locked position, generally parallel to the rear side of the upper member of the trapezoidal side members.

As shown in FIG. 4, the distal arms 121, 123 of the W-shaped locking member 120 may be curved to fit along cutouts in the outer side surfaces of the two-piece sides that allow the distal arms to nest therein. In FIG. 5, the handle 123 in the center of the generally M-shaped wire structure 120 has been moved to its horizontal position or to its position parallel to the bottom of the computer to allow the two-piece sides 116a, 117a of the accessory to begin to fold outward along their central living hinges 116b, 117b. It should also be noted that living hinges adjacent the top side surfaces and the mounting flaps and the living hinges 118a, 118b between the base 118 and the side surfaces are also contributing to allowing the side members 116, 117 to fold outwardly.

Figure 9:
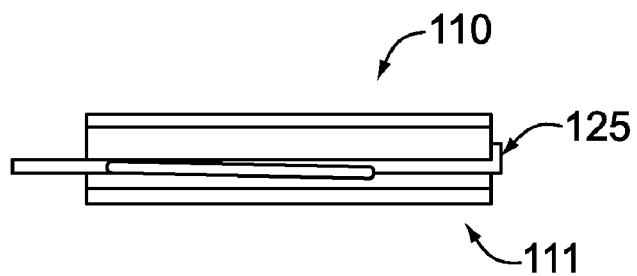
FIG. 9 is a side elevational view of the computer and accessory shown in FIG. 6.
Figure 10:
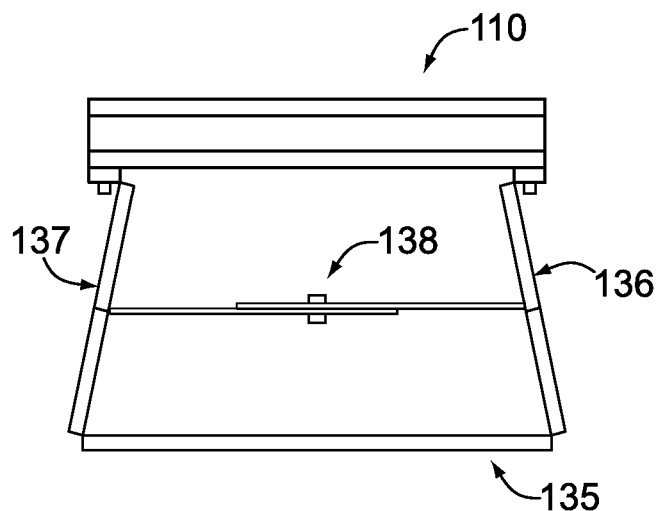
FIG. 10 is a rear elevational view of a second embodiment of the present invention.
Figure 11:
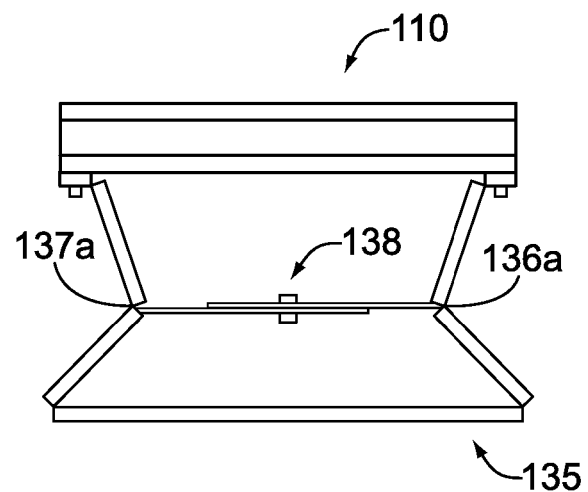
FIG. 11 is a rear elevational view of the second embodiment of the present invention shown in semi-collapsed position.

FIGS. 6 and 9 show the accessory 111 in its flat folded position with the two-piece trapezoidal side surfaces 116, 117 backfolded one half on top of the other half of each to provide a flat storage position for the accessory, up against the bottom of the laptop computer 110.

Referring to FIGS. 10-15 and 18, 19, a second embodiment 135 of the computer mounting apparatus of the present invention is shown. The second embodiment 135 is shaped similarly to the first embodiment 111 when in its upright open position. However, the second embodiment of the present invention includes two-piece generally trapezoidal side walls that fold inwardly when collapsing the accessory to a flat position rather than folding outwardly as in the first embodiment.

While several means for locking and unlocking the living hinge 136a, 137a at the joinder of each of the two-piece side walls may be used, a pivoting two-piece locking bar generally at 138 is shown in locked position between the living hinges 136a, 137a of the two piece side members.

Figure 19:
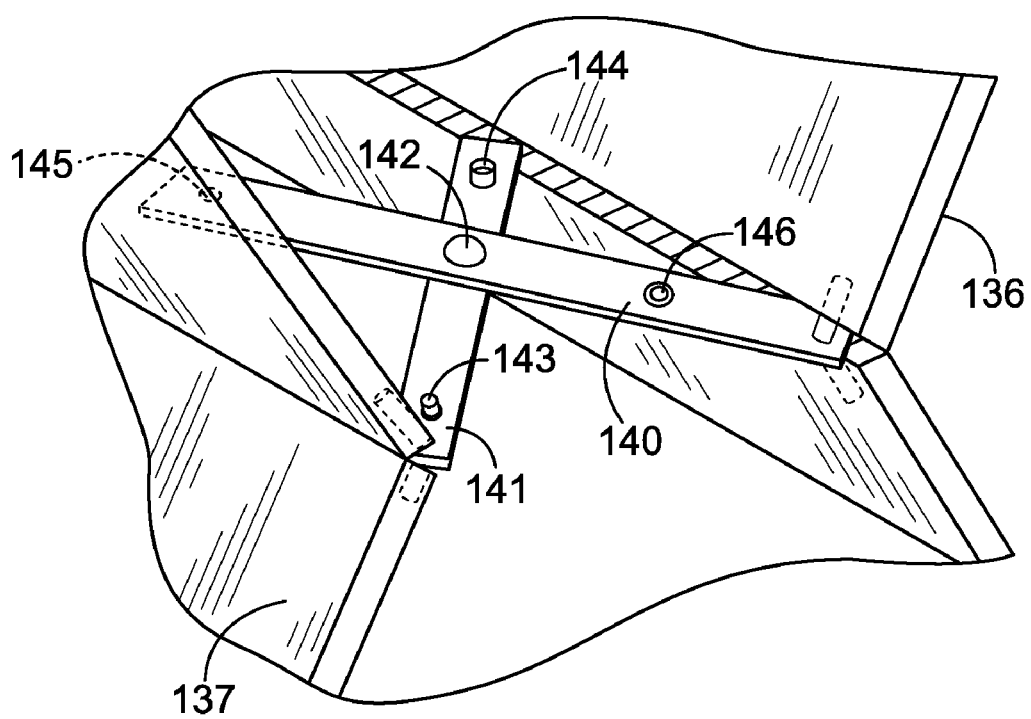
FIG. 19 is a fragmentary detail view similar to FIG. 18 showing the locking bar of the present invention in unlocked position.

In FIG. 19 the locking bar 138 is unlocked and moved from its straight position, to be described in more detail below, to its generally V-shaped position allowing the two-piece side members 136, 137 to fold inwardly toward the center of the hollow space in the middle of the foldable accessory 135.

Figure 12:
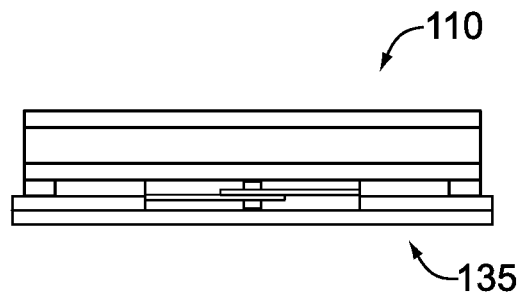
FIG. 12 is a rear elevational view of the second embodiment of the present invention shown in collapsed position.
Figure 13:
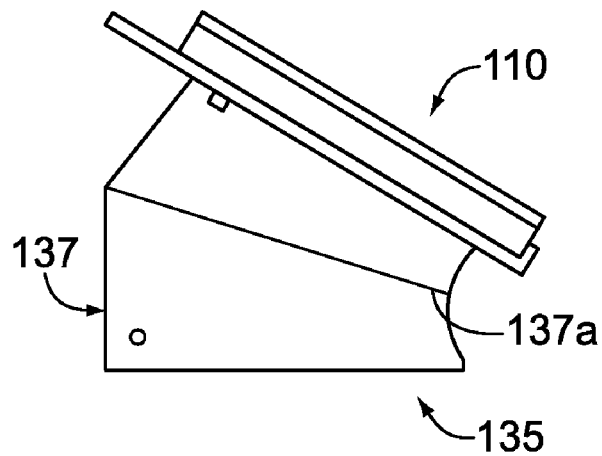
FIG. 13 is a side elevational view of the second embodiment of the present invention shown in FIG. 10.
Figure 14:
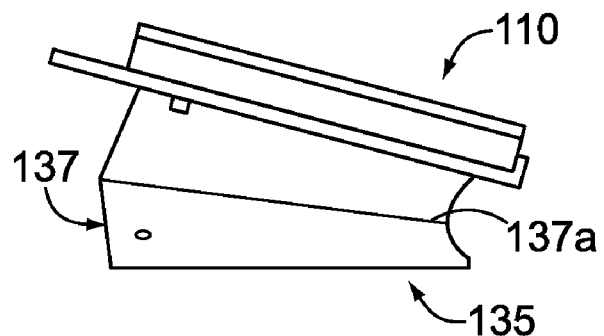
FIG. 14 is a side elevational view of the invention shown in FIG. 11.
Figure 15:
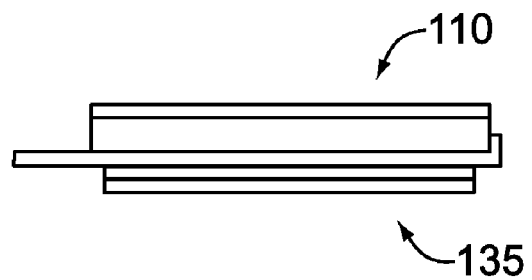
FIG. 15 is a side elevational view of the second embodiment of the present invention shown in FIG. 12.

FIGS. 12 and 15 show the second embodiment of the present invention 135 in its collapsed generally flat position with its back folded first 136 and second 137 pieces of each side member backfolded toward the interior of the accessory.

Figure 18:
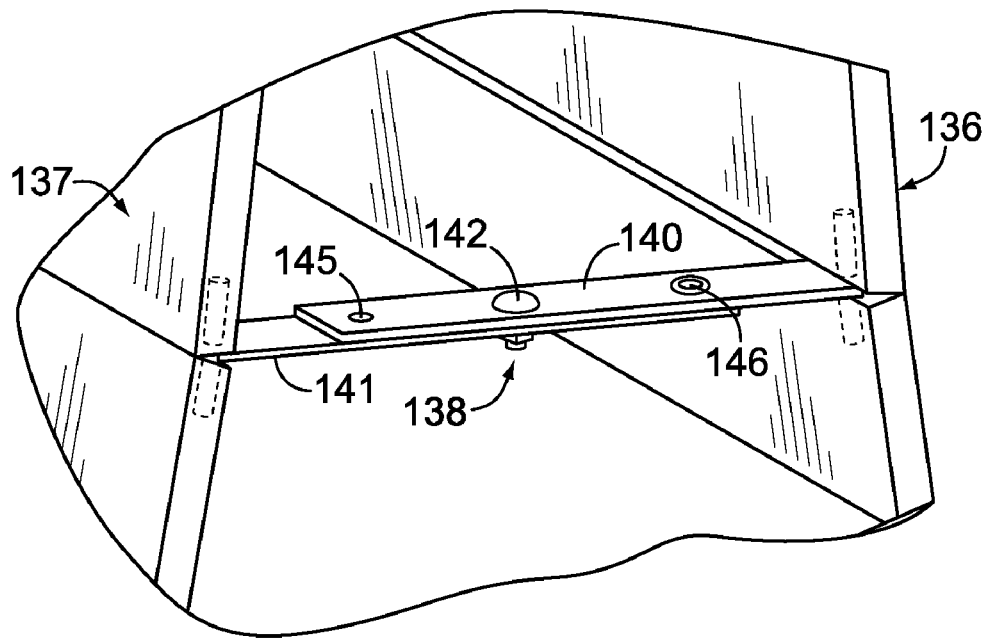
FIG. 18 is a fragmentary detailed view of a pivotal locking bar assembly for the second embodiment of the present invention in locked position.

FIGS. 18 and 19 disclose the locking bar 138 which is shown more generally in FIGS. 10-15. The locking bar 138 is a two-piece mechanism with a top member 140 and a bottom member 141 pivotally mounted at their center.

The pivoting bar locking mechanism 138 is shown as a solid bar with custom cutouts, recesses and detents. The locking bar is pivotally mounted at 142, and adjacent the living hinge between the top and bottom portions of each of the opposed side members 136, 137, as will be discussed in more detail below. The two-piece locking bars 140, 141 are also pivotally mounted to each other at 142 in juxtaposed top and bottom positions centrally thereof.

In the locking bar, a detent 143, 144 arising from one member fits into an indent 145, 146 in its complementary members side wall to lock the bar in straight position. Moving the pivot member 142 up or down slightly will move the detent out of the corresponding indent and allow the members to pivot in an X shape as shown in FIG. 19 to allow the opposed two piece side members to collapse inwardly to fold the accessory 135 in its flat folded position shown in FIGS. 12 and 15.

Figure 20:
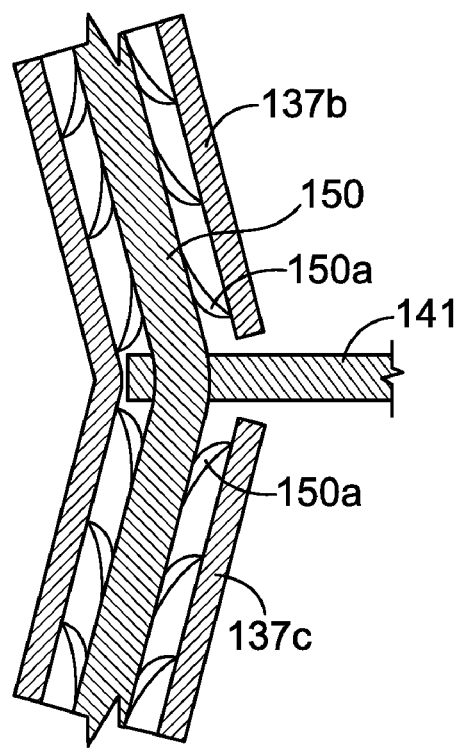
FIG. 20 is an enlarged fragmentary cross sectional view of a pivot mounting shown in the views of FIGS. 18 and 19.

FIG. 20 discloses an outside pivot member 150 positioned within the corrugations at the juncture of the two sided side members 137b, 137c where the living hinge 137a is found. The pivot member 150 is an elongate member that fits within the corrugation and may be formed of rubber, plastic or the like. The member shown in FIG. 20 is a bendable rubber rod which may be positioned in the corrugation when the sides are collapsed. Other pivot rods may also be used, such as those with one-way barbs 150a-150a to facilitate anchoring them inside of a web pocket.

Figure 16:
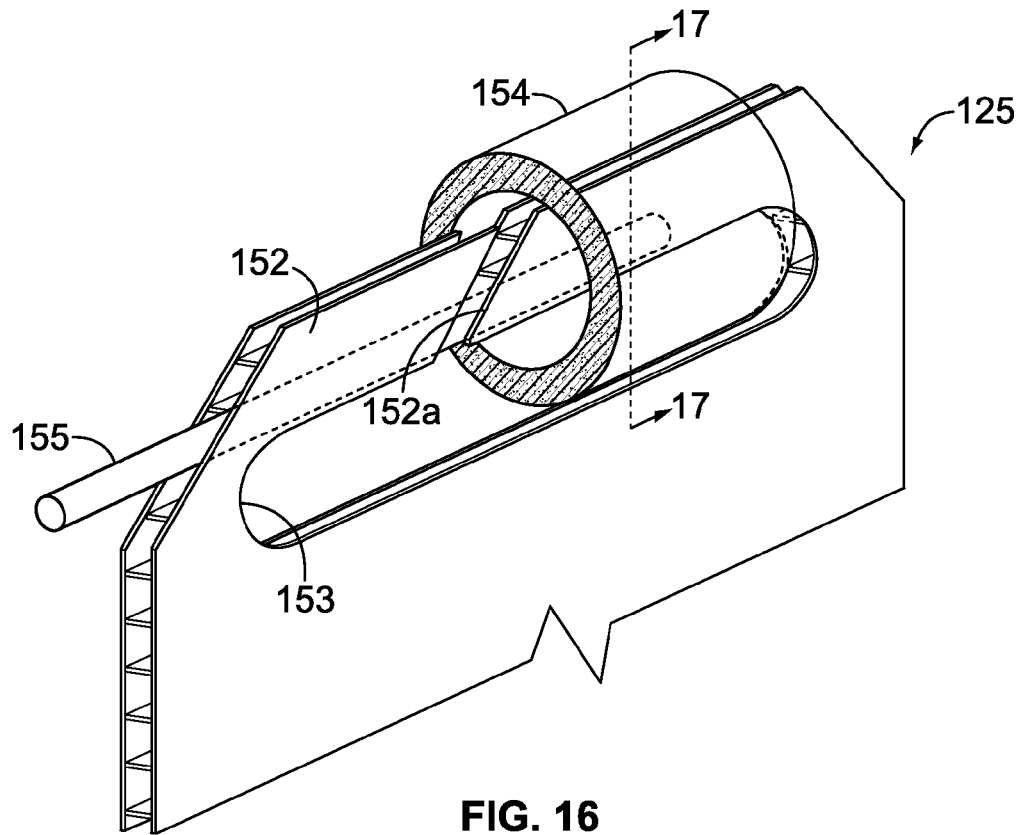
FIG. 16 is a fragmentary detail perspective view, with portions cut away, of the construction of a handle for the computer accessory of the present invention.
Figure 17:
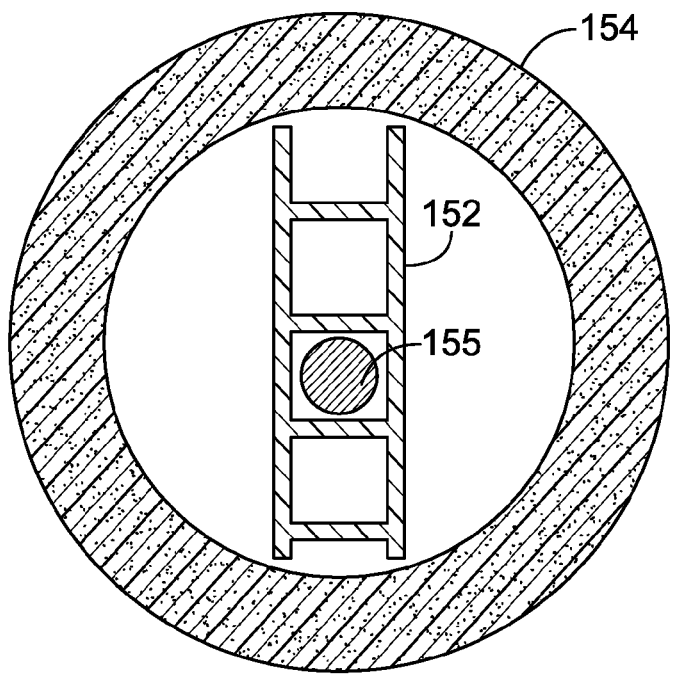
FIG. 17 is a cross sectional view taken substantially along line 10a-10a of FIG. 10.

Referring to FIGS. 16 and 17, a first modified portion of the top panel 125 of the first embodiment 111 may include a handle 152 adjacent a back side thereof. The handle 152 is formed by extending the corrugated plastic outwardly and cutting an elongate slot 153 therein for a user's fingers. In order to provide a comfortable handle for a user, a soft tubular rubber piece 154, about twice the length of that shown, is inserted over the outer portion 152 of the handle outwardly of the slot 152a formed therein. In order to provide the elongate tubular rubberized portion without a seam that might be uncomfortable to a user, a cut 152a is made across the middle of the end portion of the corrugated plastic and the rubberized tube is inserted, first over one half of the slot and then is bent to allow the other half if the handle to be inserted in the hollow middle of the tube.

In order to maintain structural integrity, a rod 155 is inserted in one of the corrugations formed on the outer portion of the plastic part of the handle 152 to run between the two halves to lock the assembly of the handle in operating position. The rod 155 may be bent along its middle or formed in a slightly arc to lock the bar within the elongate parallel interior of the individual corrugation as shown in FIG. 16.

Referring to FIGS. 22-25, a second modification for locking the collapsible side members is shown. In FIG. 22, the two-part collapsible side member 160 has a rear panel 161 that parallels the rear end of the two side panels 160a, 160b such as shown. This panel has a living hinge 162 on the inside thereof, which when the side panels are positioned in their upright or open position, the end panel is allowed to fold inwardly such that its base 161c contacts and engages the base 164 of the accessory with a detent at the bottom thereof that may lockingly engage an indent 164a in the bottom of the base 164, both in closable position shown in FIG. 24 and in open and locked position shown in FIG. 25. The use of corrugated plastic siding allows for this double folding hinge feature.

Referring to FIGS. 26-29, a third means for locking the second embodiment of the present invention in an open position utilizes the handle 165 in the upper plate 166. The handle 165 is cut along one side thereof to form another living hinge 167 which will fold downwardly to form a three-sided box with the top panel 166, and the side panel 168 when it is positioned in its upright position. A detented end portion 165a of each end of the handle 165 is sized to fit within an indent or cutout 168a in the corrugated side member 168 such that when the side member is in vertical position that detent 165a will releasably lockingly fit in the indent 168a to lock the side members in an open position. As the handle 165 is pliable, the handle may be pulled forward to allow the side members to collapse into its closed position.

Figure 21:
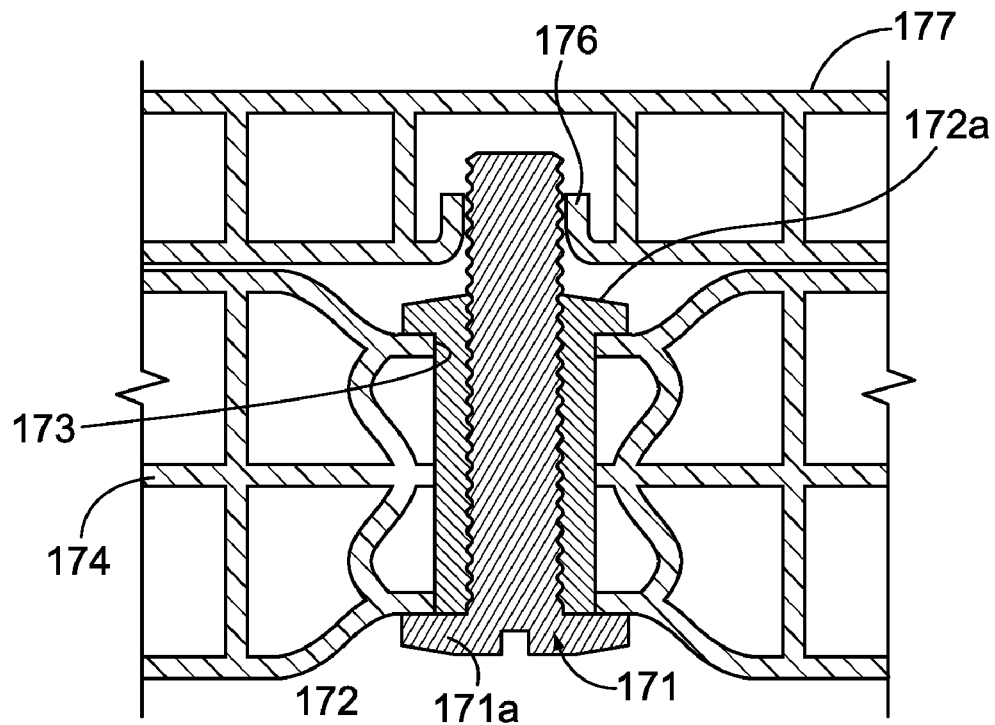
FIG. 21 is a fragmentary detailed cross sectional view of a snap locking bolt utilized in the laptop computer accessory of the present invention.

Referring to FIG. 21, a means for locking and unlocking folding adjacent members of the laptop computer accessory of the present invention is shown to include a bolt 171 and a complementary threaded hollow rivet type member 172. The bolt is positioned through an aperture 173 through the corrugated plastic panel 174, and the bolt has an enlarged head 171a along with the hollow interiorly threaded rivet member also having an enlarged head 172a. When the bolt 171 is threaded through the rivet member 172, the hollow member is sized to slightly compress the corrugated plastic panel 174 when the bolt is fully threaded thereon. The length of the bolt is such that an aperture 176 positioned through an adjacent corrugated side wall 177 will allow the threaded end bolt to retain that member on the distal end of the bolt. The aperture 176 in the corrugated member side wall 177 will elastically deform a sufficient number of times before wearing out to allow the apparatus to be locked in a closed position as desired.

Figure 30:
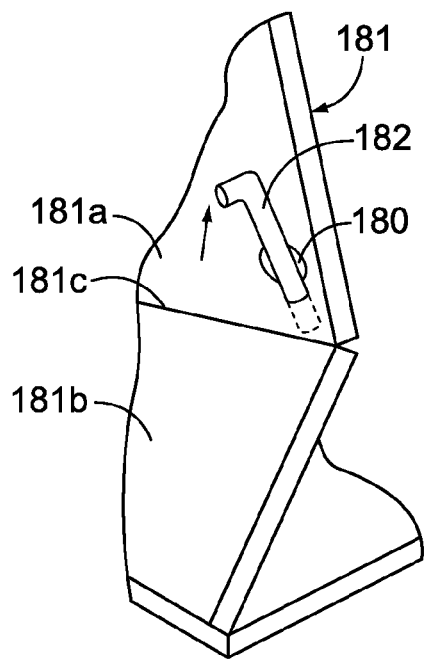
FIG. 30 is a fragmentary detailed view of a third modification of the second embodiment of the present invention showing a sliding lock system for the folding side walls thereof.
Figure 31:
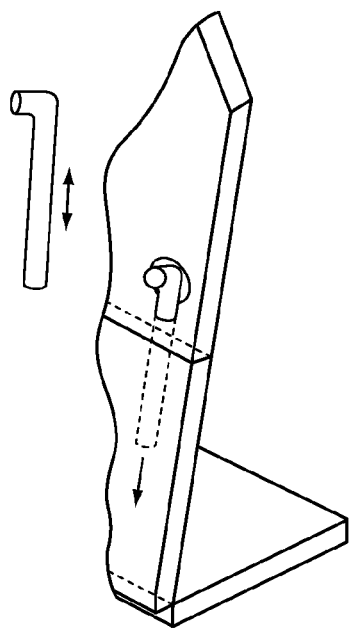
FIG. 31 is a fragmentary detailed perspective view similar to FIG. 18 showing the third modification of the second embodiment of the present invention in locked position.

FIGS. 30 and 31 disclose a fourth means for locking the two-piece folding side members of the apparatus. In this fourth modification, an aperture 180 is formed in the side wall 181 of one of the upper 181a and lower members 181b such that an L-shape pin 182 may be inserted therein along the hollow interior of the corrugation. If the pin 182 is moved upwardly in this instance, the pin 182 will move upwardly and out of the juncture 181c of the two-piece side members where the living hinge is, thus allowing the member to inwardly collapse or fold inwardly. When the pin 182 is moved downwardly such that the pin crosses the living hinge portion 181c of the joint near the two members, that pin will lock the members in open position.

Figure 32:
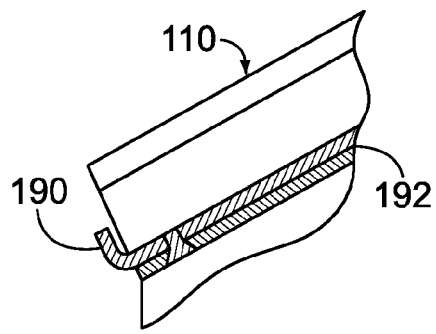
FIG. 32 shows a fragmentary cross sectional view of a first laptop computer rest positioned on the accessory of the present invention.
Figure 33:
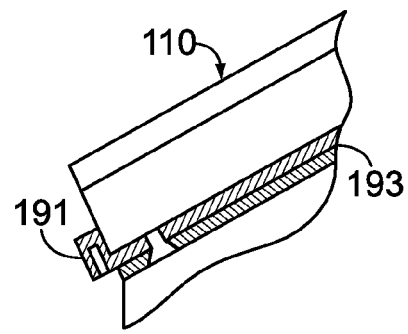
FIG. 33 shows a fragmentary view of a second laptop computer rest positioned on the accessory of the present invention.

FIGS. 32 and 33 disclose a pair of front rest or ledges 190, 191 of differing construction that are part of the upper plate 192, 193 of the accessory that allows the computer to be located in a proper mounting position on the accessory.

Figure 34:
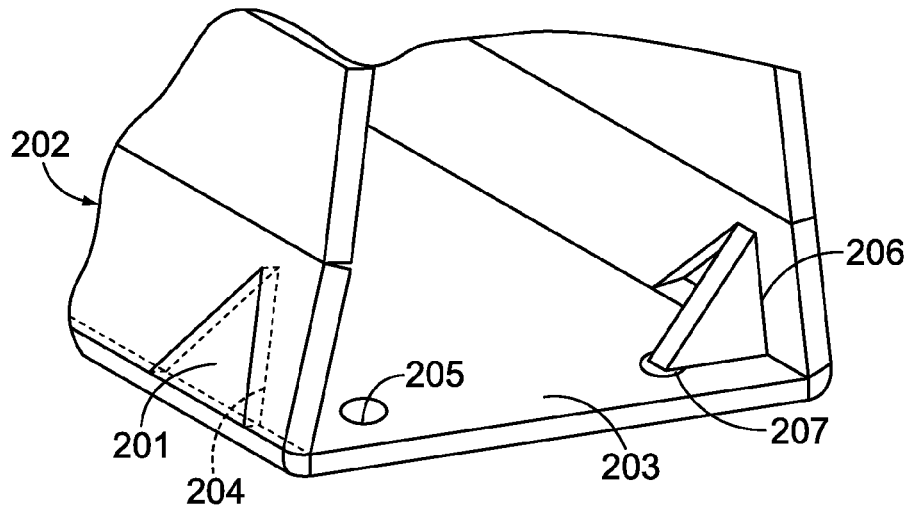
FIG. 34 shows a fourth modification of the second embodiment of the present invention showing a hinged means of locking and unlocking the side walls in position.

FIG. 34 discloses fifth means for locking the side members in open position. This fifth modification includes triangulating a portion 201 of the folding side wall 202 adjacent the base 203 of the accessory by providing another living hinge 204 (also shown at 206) where that triangulated member is attached to the side wall, the triangulated member may be moved 90 degrees when the side walls are in open position and again a depression or detent 205 (also shown at 207) in the base may provide a means for lockingly stopping the hinged member 201 to provide a fifth means for locking the second embodiment of the present invention in an open position.

Referring to FIGS. 35-38, a third embodiment accessory of the present invention, generally indicated at 210, the third accessory 210 is a simplified stand that, similarly to the first embodiment, utilizes the base of the computer 110 as part of its overall structure.

Figure 37:
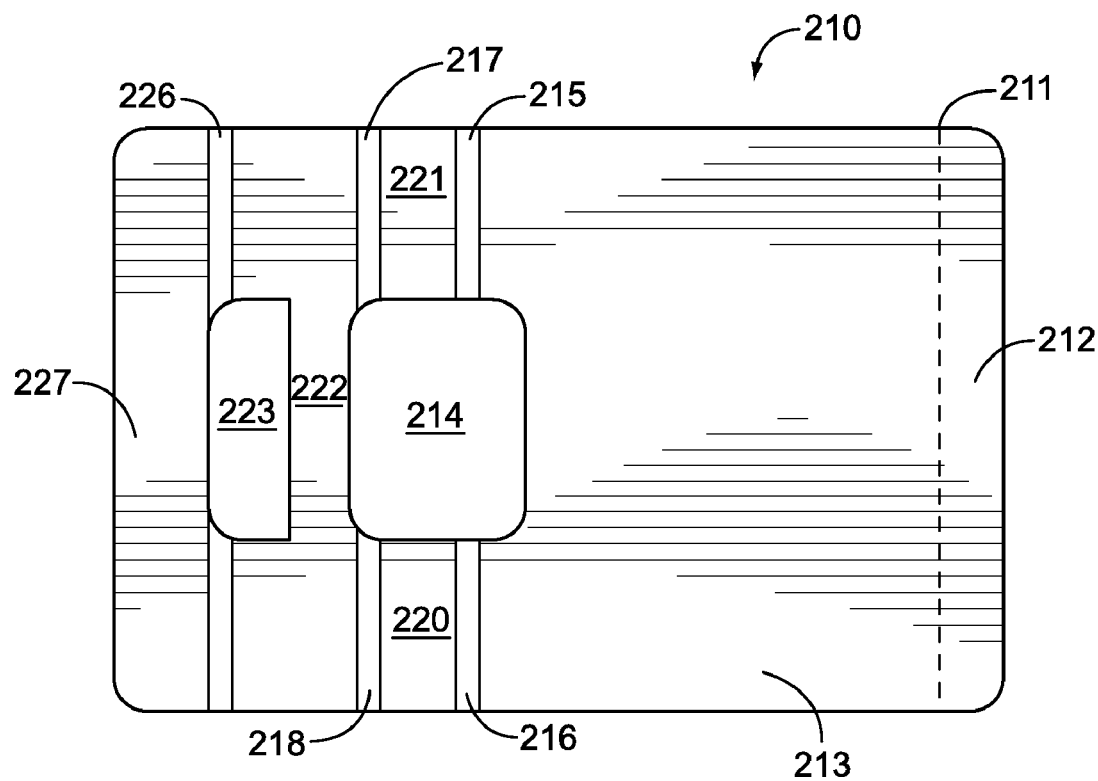
FIG. 37 is a top plan view of the third embodiment of the invention shown in blank unfolded position.

The third embodiment accessory 210 may be formed from a blank sheet of corrugated plastic similar to that used in the first two embodiments when it is cut out as shown in FIG. 37. In this third embodiment, a rectangular blank includes a plurality of vertical cuts in the top layer of the corrugation and a single cut parallel to the right edge of the blank made in the bottom surface of the corrugation. That cut, 211, provides a distal portion 212 that may be attached to a bottom of the laptop computer 110 by means of hook and loop fasteners, buttons, rivets or the like as discussed with the previous embodiments.

A relatively large flat rectangular base portion 213 provides a flat bottom for the accessory. A rectangular cutout 214 is positioned centrally axially along the length of the third embodiment adjacent and overlapping the opposite side of the base 213 from the strip 212. A cutout along the corrugation parallel to 211 leaves the opposing side of the corrugation in tact providing a living hinge 215, 216 positioned on either side of the second rectangular cutout. Additional living hinges 217, 218 are formed adjacent the opposing side of that cutout. In between are a pair of panels 220, 221 which, as shown in FIG. 35, may be backfolded to be positioned on top of the base 213 when the accessory is in its open position shown at FIG. 35.

A second panel 222 extends completely across the blank through a central portion thereof. A second aperture 223 is axially oriented similarly to and spatially related to rectangular aperture 214 for combining therewith to provide space for a user's hand. The central part of portion 222 provides a handle for the accessory which may be constructed similarly to handle 125 shown in FIG. 16. A flexible tubular member 225 is positioned over that handle 222 for ease of user gripping.

A fourth living hinge is found at 226 which is parallel to living hinges 217, 215 and 211 and spatially related thereto defining an opposing end portion 227 of the panel which provides a surface on which the opposing side of the base of computer 110 may be attached by hook and loop fasteners, etc. as shown and discussed in connection with the first embodiment.

Figure 35:
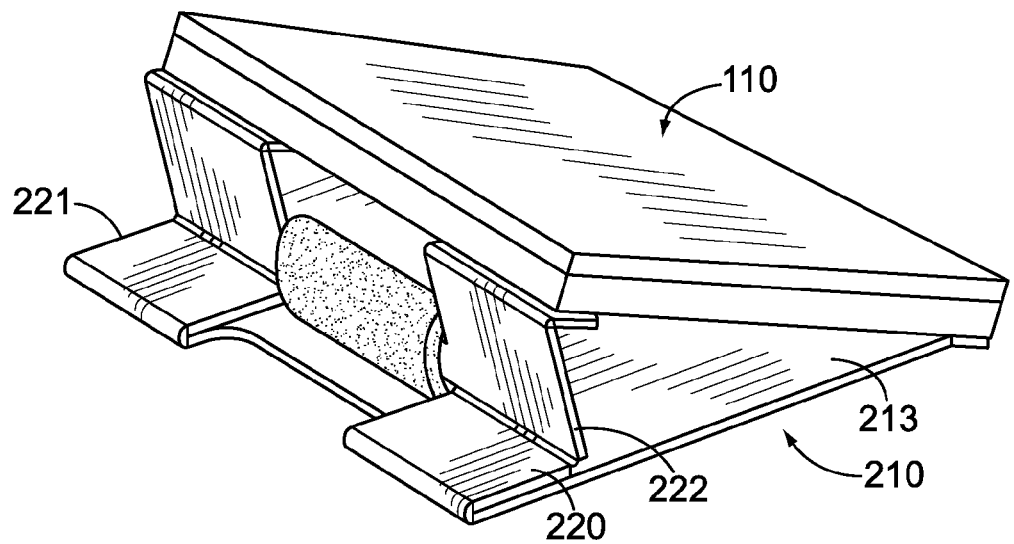
FIG. 35 is a three quarter top perspective view of a third embodiment of the present invention shown in open position.

FIG. 35 shows the third embodiment 210 of the accessory in an open position with the dual portions 220, 221 backfolded over the base such that the handle portion 222 is substantially vertical (over center folded) to provide a triangulation of the accessory when mounted on the base of the computer 110.

Figure 38:
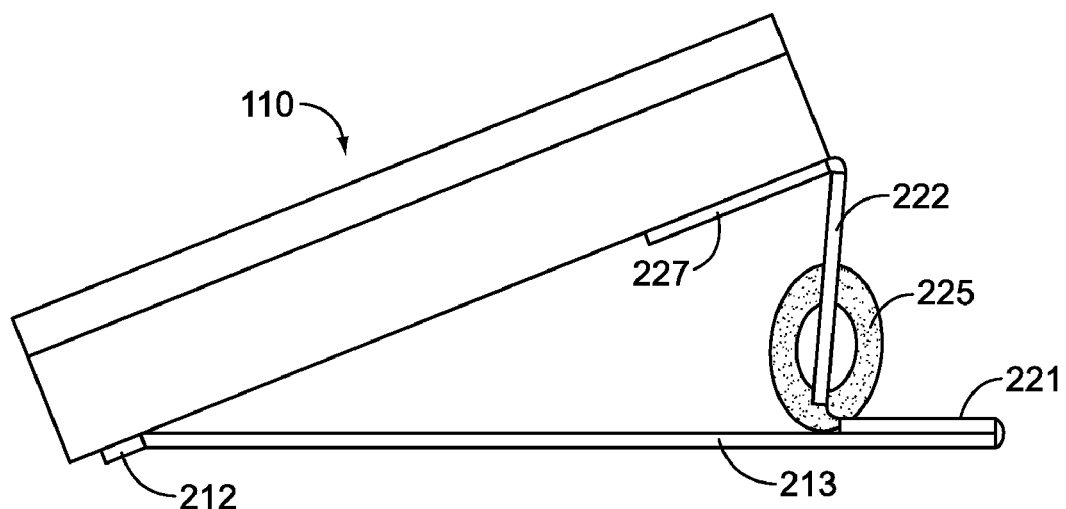
FIG. 38 is an enlarged elevational end view of the third embodiment shown in FIG. 35.

FIG. 38 shows that triangulation in greater detail.

Figure 36:
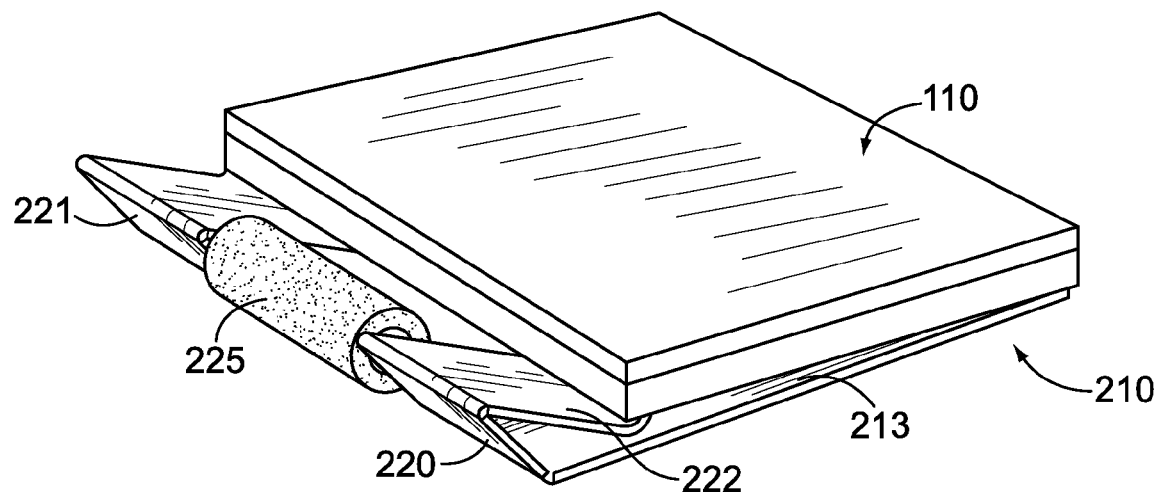
FIG. 36 is a three quarter top perspective view of the third embodiment of the present invention, similar to that shown in FIG. 35, shown in closed position.

In FIG. 36, the handle 225 has been pulled outwardly of the base 213 such that the computer 110 substantially lies parallel to that base with the handle 225 positioned externally and spatially related to the base 213, so that the combination of the accessory 210 and the computer 110 may be carried by a user gripping the handle. While corrugated plastic has been the material of choice shown herein, it should be noted that blow molded or injection molded plastic may also easily be used.

Thus, three embodiments of the proposed laptop computer mounting accessory with a number of modifications to the first and the second embodiments to provide means for locking the accessory in an open position, and for providing means for mounting the laptop computer on the accessory and for carrying a combination of the laptop computer and an accessory which is folded flat and has a handle on the end thereof have been shown and described. It will be apparent to those skilled in the art that many changes and modifications may be made without departing from the true spirit and scope of the present invention. It is the intent of the appended claims to cover all such changes and modifications which fall within the true spirit and scope of the invention.

The invention is claimed as follows:

1. A folding portable stand suitable for use on both a lap of a user and a top of a flat surface and capable of mounting a laptop computer thereon in spatial relation above said lap and said flat surface, said stand comprising:
   a generally flat base including at least two opposed side edges;
   first and second foldable opposed sides extending from respective ones of said opposed side edges of said base;
   wherein each of said foldable opposed sides is made of a corrugated plastic including,
   a front side, a rear side and a plurality of parallel spaced apart webs joining said front side and said back side;
   each of said first and second opposed sides including means adjacent an edge thereof for mounting same to one of a platform and the base of a laptop computer,
   selectably releasable means for locking each of said first and second foldable opposed sides in an open position; and the folding portable laptop stand wherein said selectably releasable means for locking each of said first and second foldable opposed sides in an open position include,
a rearward portion of each of said foldable opposed sides including a living hinge perpendicular to said parallel spaced apart webs of said corrugated plastic by a cut through one of said front and rear sides and said web ring.

2. The folding portable stand as defined in claim 1 further including:
a laptop mounting platform mountable on said mounting means adjacent an edge of each of said first and second opposed sides.

3. The folding portable laptop stand as defined in claim 2 wherein said laptop mounting platform includes,
handle means for grasping said stand positioned adjacent a rear edge thereof.

4. The folding portable laptop stand as defined in claim 1 wherein
each of said first and second opposed sides includes a pair of substantially flat wall members with a substantially horizontal living hinge therebetween allowing said sides to collapse in accordion fashion.

5. The folding portable laptop stand as defined in claim 4 wherein,
each of said pair of substantially flat wall members folds inwardly to collapse said lap stand.

6. The folding portable laptop stand as defined in claim 4 wherein,
each said pair of substantially flat wall members folds outwardly to collapse said lap stand.

7. The folding portable laptop stand as defined in claim 4 wherein each of said first and second opposed sides include cutout portions at a front thereof for ease of manual access to any electronic device positioned on said generally flat base.

8. A folding portable laptop stand comprising:
a generally flat base including at least two opposed side edges;
first and second foldable opposed sides extending from respective ones of said opposed side edges of said base;
each of said first and second opposed sides including means adjacent an edge thereof for mounting same to one of a platform and the base of a laptop computer;
selectably releasable means for locking each of said first and second foldable opposed sides in an open position; and
said selectably releasable means for locking each of said foldable opposed sides includes
a pivotally mounted member including opposed distal end portions extending substantially vertically over each of said opposed side and preventing same from collapsing relative said generally flat base.

9. A folding portable laptop stand comprising:
a generally flat base including at least two opposed side edges;
first and second foldable opposed sides extending from respective ones of said opposed side edges of said base;
each of said first and second opposed sides including means adjacent an edge thereof for mounting same to one of a platform and the base of a laptop computer;
selectably releasable means for locking each of said first and second foldable opposed sides in an open position, and
a laptop mounting platform mountable on said mounting means adjacent an edge of each of said first and second opposed sides;
said laptop mounting platform includes,
a raised lip adjacent a front edge of same for retaining and positioning a laptop computer thereon.

10. A folding portable laptop stand comprising:
a generally flat base including at least two opposed side edges;
first and second foldable opposed sides extending from respective ones of said opposed side edges of said base;
each of said first and second opposed sides including means adjacent an edge thereof for mounting same to one of a platform and the base of a laptop computer;
selectably releasable means for locking each of said first and second foldable opposed sides in an open position;
said laptop mounting platform includes:
handle means for grasping said positioned adjacent a rear edge thereof;
said handle means includes,
an internal slot through said mounting platform parallel to and inwardly adjacent said rear edge thereof, and
a tubular elastic cover positioned over a rear distal portion of said platform rearwardly of said internal slot for providing a gripable member for a user.

11. A folding portable laptop stand comprising:
a generally flat base including at least two opposed side edges;
first and second foldable opposed ends extending from respective ones of said opposed front and back edges of said base;
each of said first and second foldable opposed ends including means adjacent an edge thereof for mounting same to one of a platform and the base of a laptop computer, and
selectably releasable over center means for positioning said first and second foldable opposed ends in an open position with a spatial relation between said flat base and a bottom of any laptop computer mounted on said stand.

12. The folding portable laptop stand as defined in claim 11 wherein said overcenter means includes,
an elongate distal end member, an elongate first internal member inwardly adjacent said distal end member, and a pair of third members positioned in spaced relation to one another and between said elongate first internal member and said generally flat base, and
a plurality of living hinges, one positioned between said distal end member and said first internal member, at least one between said first internal member and said third pair of members, and at least one between said third pair of members and said generally flat base.

13. The folding portable laptop stand as defined in claim 12 wherein said over center means further includes,
said third pair of members being backfoldable over a portion of said generally flat base adjacent thereto, and having a length greater than the length of said generally flat base minus the depth of any laptop computer mounted thereon.

14. The folding portable laptop stand as defined in claim 11 wherein said means for mounting said foldable opposed ends to the base of a laptop computer include,
hook and loop fasteners.

15. A folding portable laptop stand comprising:
a generally flat base including at least two opposed side edges;
first and second foldable opposed sides extending from respective ones of said opposed side edges of said base;
each of said first and second opposed sides including means adjacent an edge thereof for mounting same to one of a platform and the base of a laptop computer;

selectably releasable means for locking each of said first and second foldable opposed sides in an open position, said selectably releasable means for locking each of said foldable opposed sides includes, a locking mechanism including two opposing members pivotally mounted to each other inwardly of their opposed ends, with an outermost opposed end of each pivotally mounted to one of said first and second opposed sides, and one of detents and indents positioned adjacent unmounted inward ends of said opposing members selectably releasably engaging complementary ones of detents and indents on the opposite of said opposing member when said members are aligned in overlapping position.

16. A folding portable laptop stand comprising:

a generally flat base including at least two opposed side edges;

first and second foldable opposed sides extending from respective ones of said opposed side edges of said base;

each of said first and second opposed sides including means adjacent an edge thereof for mounting same to one of a platform and the base of a laptop computer, selectably releasable means for locking each of said first and second foldable opposed sides in an open position;

each of said first and second opposed sides includes a pair of substantially flat wall members with a substantially horizontal living hinge therebetween allowing said sides to collapse in accordion fashion;

each of said pair of substantially flat wall members folds inwardly to collapse said lap stand;

said selectably releasable means for locking each of said foldable opposed sides includes, a locking mechanism including two opposing members pivotally mounted to each other inwardly of their opposed ends with an outermost opposed end of each pivotally mounted to one of said first and second opposed sides, and one of detents and indents positioned adjacent unmounted inward ends of said opposing members selectably releasably engaging complementary ones of detents and indents on the opposite of said opposing member when said members are aligned in overlapping position.

17. A folding portable laptop stand comprising:

a generally flat base including at least two opposed side edges;

first and second foldable opposed sides extending from respective ones of said opposed side edges of said base;

each of said first and second opposed sides including means adjacent an edge thereof for mounting same to one of a platform and the base of a laptop computer, selectably releasable means for locking each of said first and second foldable opposed sides in an open position;

each of said first and second opposed sides includes a pair of substantially flat wall members with a substantially horizontal living hinge therebetween allowing said sides to collapse in accordion fashion;

each said pair of substantially flat wall members folds outwardly to collapse said lap stand, and said selectably releasable means for locking each of said foldable opposed sides includes, a pivotally mounted member including opposed distal end portions extending substantially vertically over each of said opposed side and preventing same from collapsing relative said generally flat base.

18. A folding portable laptop stand comprising:

a generally flat base including at least two opposed side edges;

first and second foldable opposed sides extending from respective ones of said opposed side edges of said base;

each of said first and second opposed sides including means adjacent an edge thereof for mounting same to one of a platform and the base of a laptop computer, selectably releasable means for locking each of said first and second foldable opposed sides in an open position;

a laptop mounting platform mountable on said mounting means adjacent an edge of each of said first and second opposed sides, said laptop mounting platform is made of a corrugated plastic including, a top side, a bottom side and a plurality of parallel spaced apart webs joining said top side and said bottom side, and a rear portion of said mounting platform includes an elongate slot parallel to and spaced apart from a back side thereof forming a handle for a user to carry said stand.

* * * * *